(12) United States Patent
Harwood

(10) Patent No.: US 7,099,548 B2
(45) Date of Patent: Aug. 29, 2006

(54) REDUCTION OF POLARIZATION DEPENDENCE IN PLANAR OPTICAL WAVEGUIDES

(75) Inventor: Duncan W. Harwood, Santa Clara, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/070,323

(22) Filed: Mar. 2, 2005

(65) Prior Publication Data

US 2005/0196117 A1    Sep. 8, 2005

Related U.S. Application Data

(60) Provisional application No. 60/549,253, filed on Mar. 2, 2004.

(51) Int. Cl.
*G02B 6/10*    (2006.01)
(52) U.S. Cl. ...................................... 385/129
(58) Field of Classification Search ...................... None
See application file for complete search history.

(56) References Cited

U.S. PATENT DOCUMENTS

| | | | | |
|---|---|---|---|---|
| 6,122,934 | A | 9/2000 | Narita et al. .................. | 65/379 |
| 6,826,345 | B1 | 11/2004 | Zhong et al. ................ | 385/129 |
| 2003/0044151 | A1* | 3/2003 | Zhong et al. ................ | 385/129 |
| 2003/0123828 | A1* | 7/2003 | Garito et al. ................ | 385/129 |
| 2004/0105647 | A1 | 6/2004 | Klekamp et al. ........... | 385/132 |

FOREIGN PATENT DOCUMENTS

GB    2 355 078 A    4/2001

OTHER PUBLICATIONS

A. Kilian et al., "Birefringence Free Planar Optical Waveguide Made by Flame Hyrdrolysis Deposition (FHD) Through Tailoring of the Overcladding", Journal of Lightwave Technology, vol. 18, No. 2, Feb. 2000, pp. 193-198.

* cited by examiner

*Primary Examiner*—Michelle Connelly-Cushwa
*Assistant Examiner*—Chris Chu
(74) *Attorney, Agent, or Firm*—Allen, Dyer, Doppelt, Milbrath & Gilchrist, P.A.

(57) ABSTRACT

The invention relates to a method of reducing polarization dependence in planar optical waveguides using index and coefficient of thermal expansion (CTE) matched material between the optical waveguide core and the cladding layer. For coupled mode devices such as the directional coupler or mode conversion horn polarization sensitivity has been linked to birefringence in the cladding, since their operation is dependent on co-propagation of fundamental and higher order mode(s), which are not as strongly confined to the waveguide core. Polarization sensitivity can be reduced by reducing the CTE mismatch between the core and cladding, or by moving the birefringence away from the core/cladding boundary, or both. To accomplish this, silica material, or similar material for refractive index (RI) and CTE matching is applied between the core and cladding to waveguide features where significant transmission occurs in the cladding.

17 Claims, 6 Drawing Sheets

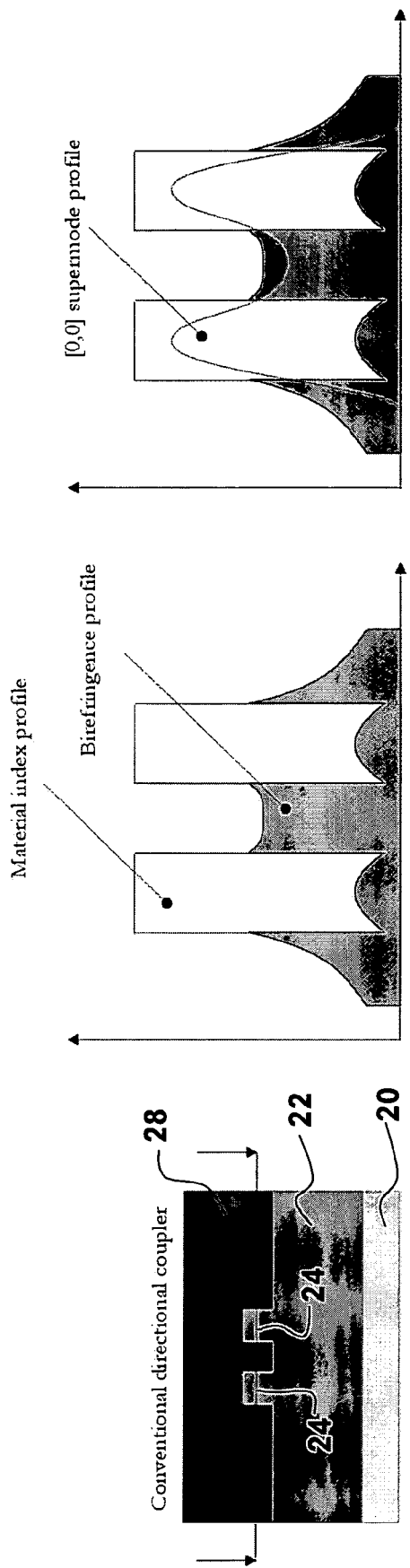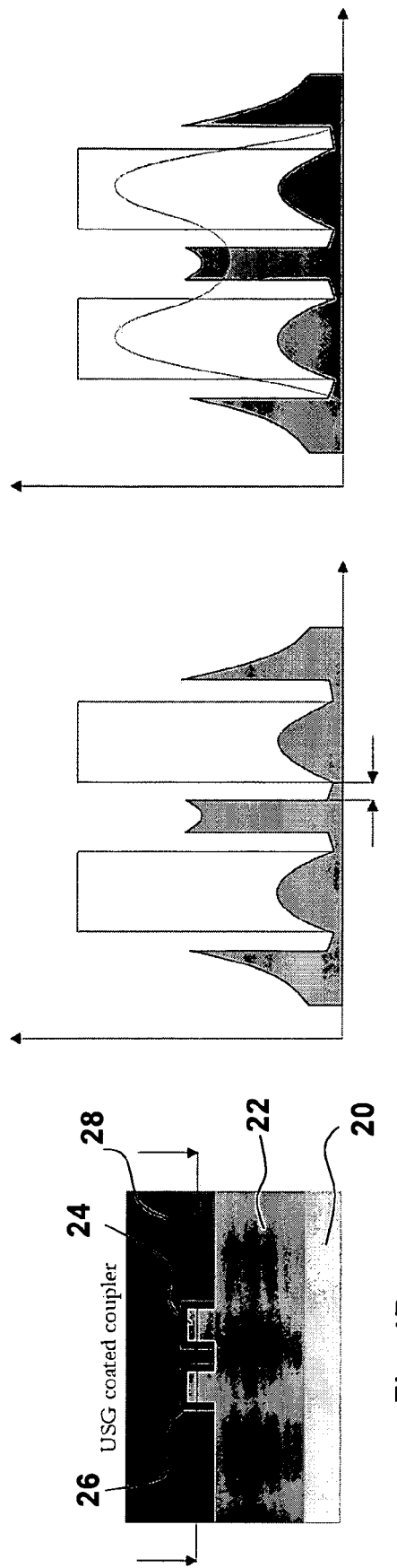

REDUCTION OF POLARIZATION DEPENDENCE IN PLANAR OPTICAL WAVEGUIDES

CROSS-REFERENCE TO RELATED APPLICATIONS

This application claims priority from U.S. provisional application No. 60/549,253 filed Mar. 2, 2004 which is incorporated herein by reference for all purposes.

MICROFICHE APPENDIX

Not Applicable.

TECHNICAL FIELD

The present application relates to a method of reducing polarization dependence in planar optical waveguides using index and coefficient of thermal expansion (CTE) matched material between the optical waveguide core and the cladding layer; and further relates to planar optical waveguide devices incorporating the same.

BACKGROUND OF THE INVENTION

Planar lightwave circuits (PLC) are optical devices including planar optical waveguides formed on a silicon wafer substrate, wherein the waveguides are made from transmissive media which have a higher refractive index than the outlying cladding layers in order to guide light along the optical path. PLCs are designed to integrate multiple components and functionalities into a single optical chip, primarily for the telecommunications industry.

In designing any optical device for fabrication on a PLC, the design and fabrication of the optical waveguides is very important. The dimensions of the waveguides, and the separation of one waveguide from another, influence the stress on the waveguide, and hence the birefringence exhibited by the waveguide. The waveguide birefringence may give rise to undesirable polarization dependence properties such as polarization dependent loss (PDL) and polarization dependent wavelength of the optical device. For most component manufacturers and their customers it is important for the waveguide birefringence (B) through the device to be as low as possible, ideally zero, where B is commonly defined as the difference between the effective refractive indices experienced by TM and TE polarized light.

Polarization dependence of waveguide devices originates from stress induced birefringence in the waveguide layers which perturbs the desired index profile of the waveguide and leads to a difference in the effective modal index for the two polarizations.

Stress birefringence can lead to a difference in the effective index of the waveguide modes for the two polarizations, which is particularly detrimental in phase sensitive devices such as an arrayed waveguide grating (AWG) or a Mach-Zehnder Interferometer (MZI). For example, in an AWG, birefringence in the waveguides of the phase array leads to a splitting in the transmission spectrum of the device for the two polarizations, termed polarization dependent wavelength (PDW), resulting in an unacceptable polarization dependent loss if the PDW is large.

Polarization dependence in these devices is generally believed to be the result of differences of the thermal expansion properties between layers in the device structures causing stresses during the manufacturing process. Asymmetric stress in the waveguide cores results in birefringence.

U.S. Pat. No. 6,826,345 to Fan Zhong et al. issued Nov. 30, 2004 discloses a solution for birefringence in phase sensitive devices comprising a top cap layer of selected thickness on the top surface of the waveguide to reduce stress differences in the waveguide core. The method is said to reduce or substantially eliminate birefringence in an AWG device. For these devices, the polarization dependence is perturbed mainly by changes in the stress induced birefringence close to the center of the waveguide mode. The top cap does not cover the sidewalls of the waveguide core. Birefringence in the cladding layer is not considered.

Polarization dependence (such as PDL) is also of importance in devices that are not phase sensitive such as directional couplers, splitters and parabolic horns. For these devices, several factors can influence the polarization dependence of the design. However, it has been found that the stress, and hence birefringence, in the cladding is the more dominant factor in limiting the polarization sensitivity of the device than the waveguide core birefringence. This is particularly true for coupled mode devices such as the directional coupler or mode conversion horn. In both these examples, operation of the device is essentially dependent on co-propagation of fundamental and higher order mode(s), which are not as strongly confined to the waveguide core.

It is known in the prior art to dope the cladding to match its CTE to that of the substrate for the purposes of reducing waveguide birefringence (A. Kilian, J. Kirchhof, B. Kuhlow, G. Przyrembel and W. Wischmann 'Birefringence free planar optical waveguide made by FHD through tailoring of the overcladding' *Journal of Lightwave Technology*) but heavy doping affects the environmental stability of the device and the cladding to core stress is still present.

A further problem affecting the performance of planar waveguides is that during formation of the cladding and waveguiding layers gas pockets can be trapped under subsequent consolidated layers. Gas also becomes trapped between closely spaced waveguides such as directional couplers, Y splitters and similar structures. Such gas pockets disrupt the optical properties of the PLC layers. In an application by Kymata Limited, publication number GB 2,355,078 A, published Apr. 11, 2001, this problem is addressed by providing a composite cladding layer including a cladding interface between the waveguide core and an outer cladding portion. The cladding interface portion has a lower consolidation temperature than the outer cladding portion. Both cladding layers are consolidated together. Dopant ions are used to lower the softening temperature and maintain the refractive index. Doping is also suggested to match the thermal coefficient to that of the buffer layer. Birefringence in the cladding layer is not recognized as a source of PDL, however, and because the CTE is not matched between the core and cladding interface, the cladding interface does not separate the refractive index from the birefringence.

Accordingly, a method for reducing PDL in planar waveguide structures remains highly desirable.

SUMMARY OF THE INVENTION

The present invention has found that polarization sensitivity can be reduced by reducing the CTE mismatch between the core and cladding, or by moving the birefringence away from the core/cladding boundary, or both. To accomplish this, silica material, or similar material for refractive index (RI) and CTE matching is applied between the core and cladding to waveguide features where significant transmission occurs in the cladding, such as high bend radius areas or close proximity coupling waveguides. The silica material USG (undoped silica glass) has a CTE substantially equal to the waveguide core and a RI substantially equal to the cladding material. The CTE match does not have to be exact, although it should be as close as possible, preferably within 0.2 ppm/K. This structure reduces overlap of propagating TE and TM modes with birefringence perturbation in the cladding.

Accordingly, an object of the present invention is to provide a planar optical waveguide for guiding optical signals comprising:
  a substrate;
  a lower cladding layer supported on the substrate;
  a waveguide core supported on the lower cladding material having four side surfaces, the core having a refractive index (RI core) and a coefficient of thermal expansion (CTE core);
  an upper cladding layer having a refractive index (RI clad) unequal to RI core and a birefringence B; and
  a CTE matching material disposed between the waveguide core and the upper cladding layer contacting at least one surface of the waveguide core where an overlap integral between a mode profile transmitted therethrough and the cladding birefringence B is largest, the CTE matching material having a refractive index (RI material) substantially equal to RI clad and a coefficient of thermal expansion (CTE material) substantially equal to CTE core.

An aspect of the present invention provides that the CTE matching material has a CTE sufficiently close to CTE core for separating stress induced birefringence in the cladding from the RI profile of the waveguide core. And furthermore, The planar optical waveguide defined in claim 2, wherein the upper cladding layer has a CTE clad substantially equal to a CTE of the substrate.

In embodiments of the invention, a planar optical waveguide device comprises a planar optical waveguide device comprising:
  a substrate;
  a lower cladding layer supported on the substrate;
  two optical waveguide cores on the lower cladding layer disposed sufficiently closely adjacent to each other to enable mode coupling between them of optical signals transmitted therethrough, said waveguide cores each having four sides and a refractive index (RI core) and a coefficient of thermal expansion (CTE core);
  an upper cladding layer having a refractive index (RI clad) unequal to RI core; and
  a CTE matching material disposed between the adjacent waveguide cores contacting at least one side of each of the waveguide cores opposite each other, the CTE matching material having a refractive index (RI material) substantially equal to RI clad and a coefficient of thermal expansion (CTE material) substantially equal to CTE core.

BRIEF DESCRIPTION OF THE DRAWINGS

Further features and advantages of the present invention will become apparent from the following detailed description, taken in combination with the appended drawings, in which:

FIG. 4a illustrates a prior art directional coupler without a conformal layer, in cross-section, FIG. 4b illustrates a directional coupler in accordance with the present invention including a conformal layer, in cross-section;

FIGS. 5a–5b graphically illustrate the material index, the birefringence profile and the supermode profile for the prior art device in FIG. 4a;

FIGS. 5c–5d graphically illustrate the material index, the birefringence profile and the supermode profile for the device in FIG. 4b;

It will be noted that throughout the appended drawings, like features are identified by like reference numerals.

DETAILED DESCRIPTION OF THE PREFERRED EMBODIMENT

As discussed above, birefringence experienced in mode coupled devices is largely a result of thermal stress at the core/cladding interface caused by different coefficients of thermal expansion of the two materials during fabrication. Typically PLCs comprise a silicon substrate, cladding layers of borophosphosilicate glass (BPSG), and waveguide cores fashioned of germanosilicate glass (GSG) or phosphosilicate glass (PSG). The CTE of BPSG and GSG are approximately 3.4 ppm/K and approximately 1 ppm/K. Other materials used in PLCs, such as silicon oxynitride or aluminum oxide cause similar problems.

Figure 1B:
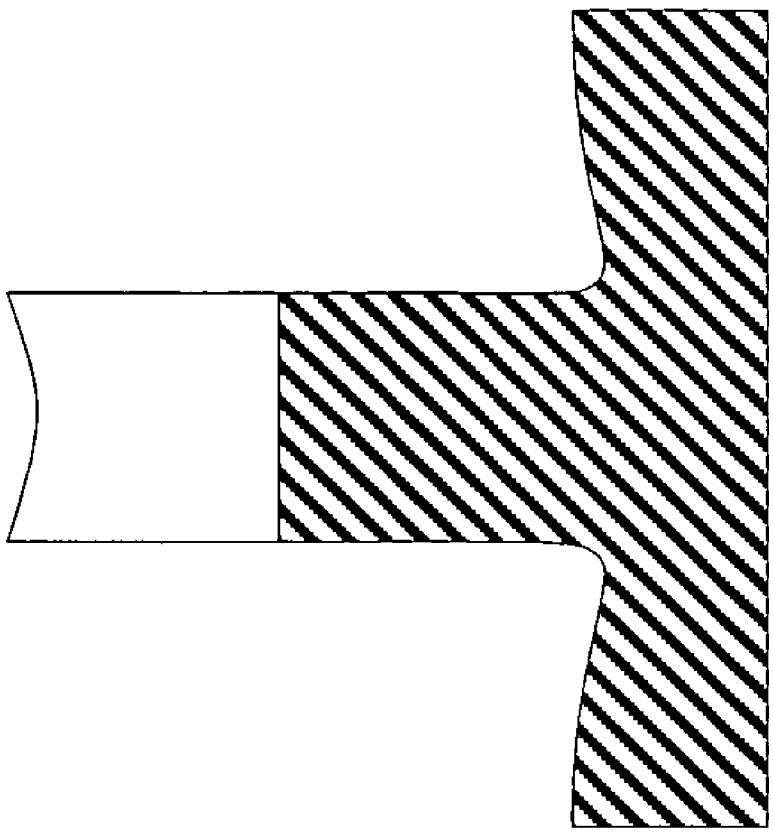
FIGS. 1a–1b illustrate a 2 dimensional representation of a birefringence perturbed refractive index step profile for and optical waveguide for both the TM and TE modes.
Figure 1A:
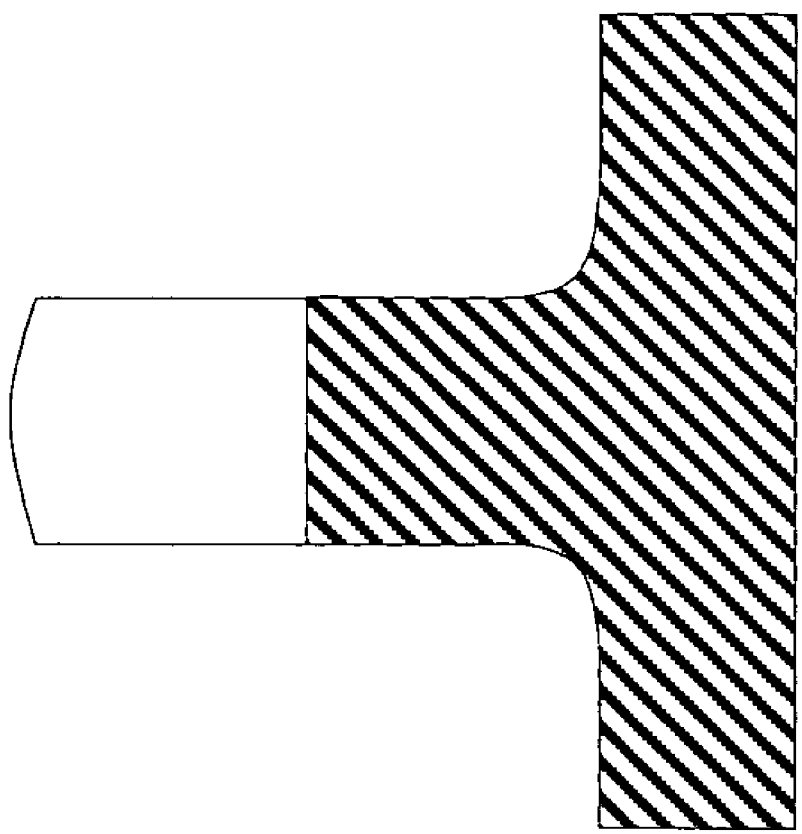

Stress induced birefringence in the cladding alters the cladding/core index profile of a waveguide differently for the TM and TE modes. As illustrated in FIG. 1a, the regular step function of an unstressed waveguide is raised and rounded for the TM mode permitting the TM light to pass through the core/cladding interface more easily. By contrast as seen in FIG. 1b, the refractive index profile for the TE mode is lowered and the TE mode is more confined. As a consequence, the TM mode travels more easily between adjacent waveguides.

Figure 2B:
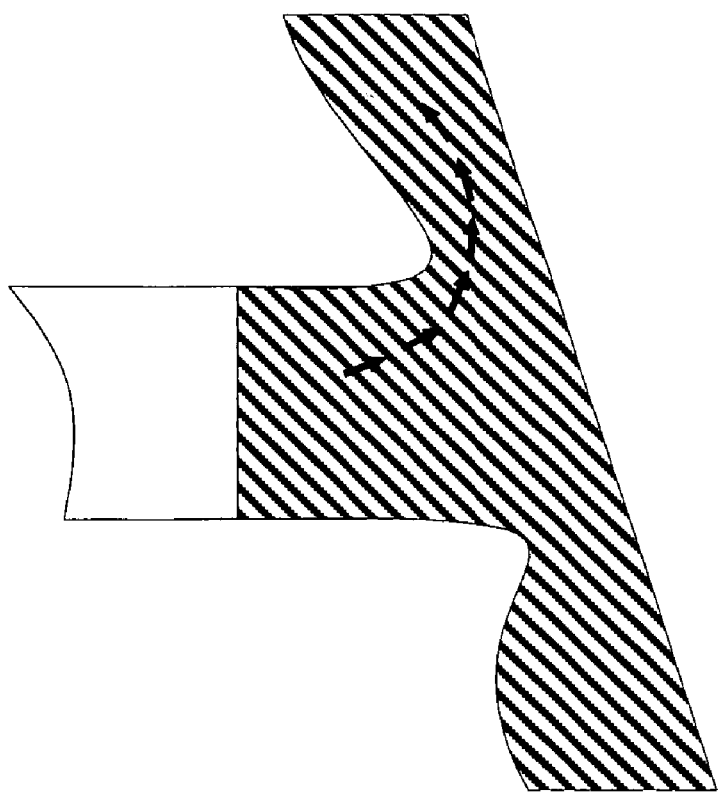
FIGS. 2a–2b illustrate the refractive index profiles of FIG. 1 for a curved waveguide.
Figure 2A:
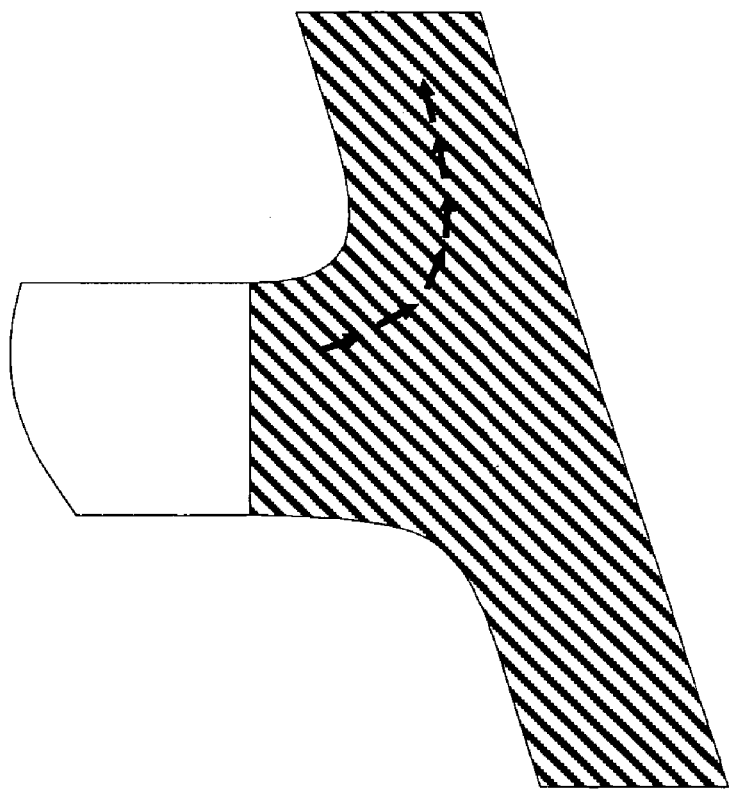

FIGS. 2a–2b illustrate the same birefringent effect on the refractive index profiles for a curved waveguide. The TM profile, FIG. 2a, becomes more rounded and less confined. The TE profile, FIG. 2b becomes deeper and more confining. A curve in the waveguide has the effect of tilting the refractive index profile seen by the mode. The tighter the bend radius, the larger the tilt in the refractive index profile. As a result, the light is less confined on the outside of the bend and so radiates away causing increased propagation loss. The same differences between the stress induced index profile for the TM and TE modes exists for curved waveguides but is exaggerated by the effect of tilting the profile. As the waveguide bend radius decreases the loss for the two polarizations increases but not at the same rate. Therefore, as the insertion loss of the bend increases, so too does the PDL.

For transmission of the well confined fundamental mode in single (straight) waveguides birefringence in the cladding does not cause noticeable PDL. However, for waveguides where transmission of the fundamental mode is forced into the cladding, as in the outer radius of curved waveguides, or in the case of optical couplers where coupling is strongly dependent on the transmission of higher order modes through the cladding, birefringence in the cladding leads to high PDL. It has been, in fact, very difficult to achieve a low PDL coupler.

For coupled mode devices, such as the directional coupler or mode conversion horn, it has been found that birefringence in the cladding is the more dominant factor contributing to polarization sensitivity of the device over birefringence in the waveguide core. Since these structures support more than one optical mode, the effective index for each polarization of each optical mode will be strongly influenced by the spatial overlap of the modal intensity with the refractive index and birefringence profiles. In a directional coupler polarization dependent losses occur between the waveguide cores. For splitters the effect is seen in the birefringence of higher order "leaky" modes. And in the parabolic horn polarization dependent loss is attributable to birefringence of the second order mode.

Figure 3A:
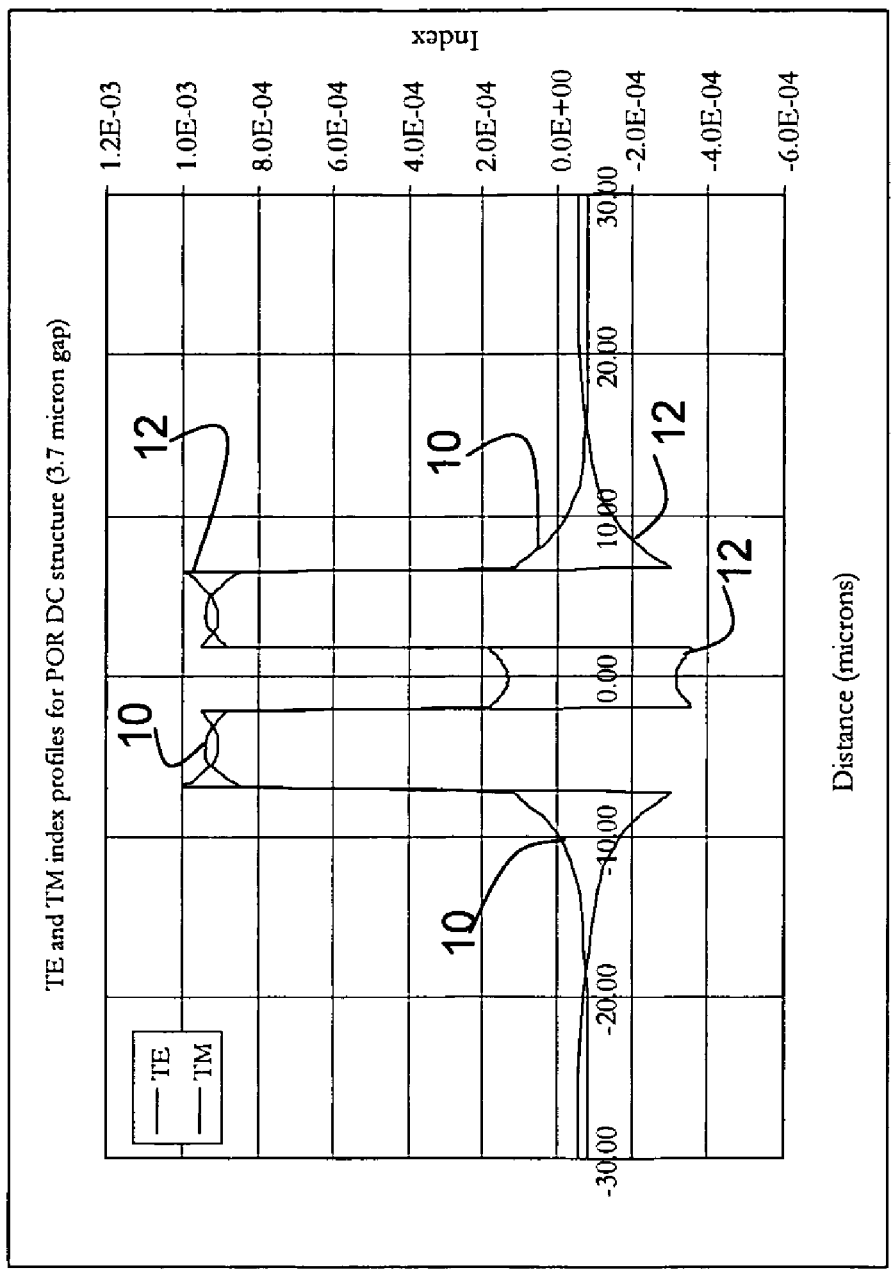
FIGS. 3a–3b are graphic illustrations of the refractive index profiles for both the TM and TE modes in a directional coupler at 3.7 micron spacing and at 10 micron spacing.
Figure 3B:
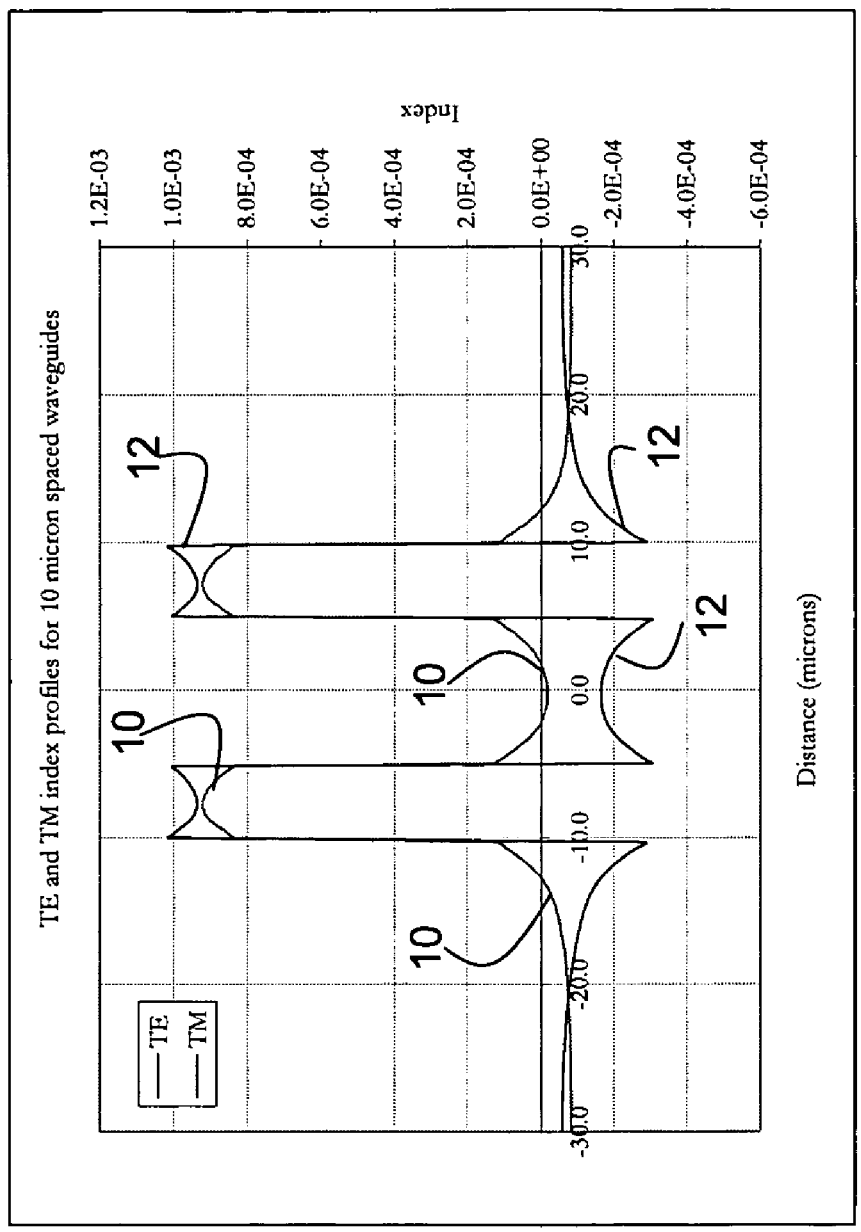
Figure 6:
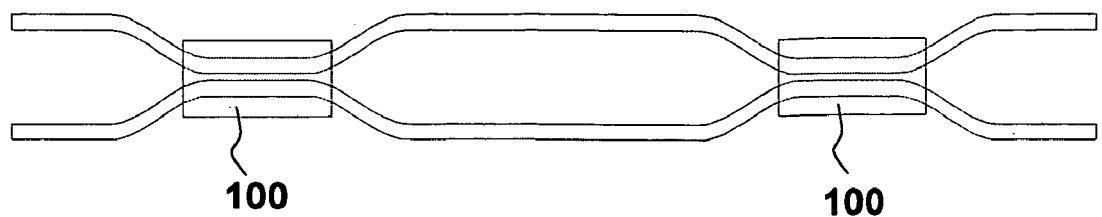
FIG. 6 is a schematic illustration of a Mach-Zehnder Interferometer Variable Optical Attenuator or switch including directional couplers shown in plan view.
Figure 7:
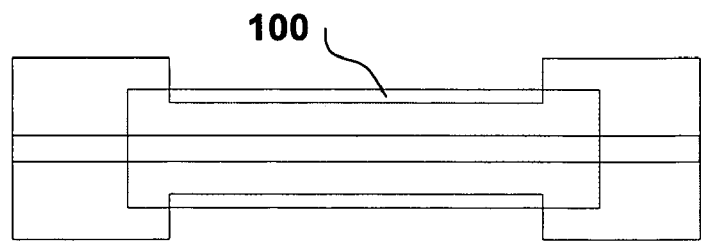
FIG. 7 is a schematic illustration of an electrical variable optical attenuator shown in plan view.
Figure 8:
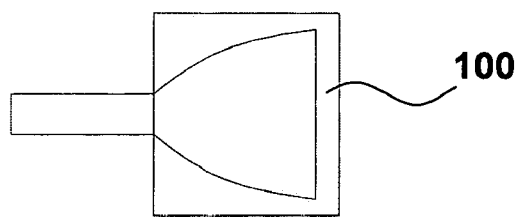
FIG. 8 is a schematic illustration of a parabolic horn mode conversion device such as for coupling to an AWG, shown in plan view.
Figure 9:
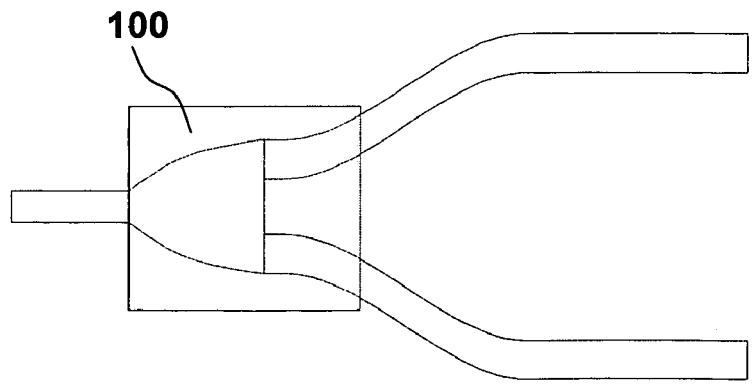
FIG. 9 is a schematic illustration of a Y-splitter shown in plan view.

In the case of the directional coupler, as seen in the graphs of FIGS. 3a–3b, as the waveguides are brought closer together, the stress induced refractive index profiles of the individual guides begin to overlap. The TM mode is labeled 10 and the TE mode is labeled 12. The smaller the distance between the waveguides, the greater the difference between the index coupling the TM mode and the index coupling the TE mode across the waveguides. The influence of one waveguide on the stress induced index profile of another starts to become significant when the gap between the waveguides is smaller than 15–20 microns. However, depending upon the design of the individual waveguides, optical coupling does not become significant until the gap between the waveguides is on the order of 4–5 microns. Thus, by the time the waveguides are close enough to make coupled mode devices, the stress build up will affect performance.

The stress induced index profile of the directional coupler will change the coupling ratio for the TE and TM modes of the coupler. However, to minimize PDL, it does not matter if stress changes the coupling ratio of the coupler provided that the coupling length for the two polarizations is the same. The individual waveguides can be highly birefringent as long as the difference in the index for the supermodes of the combined waveguides is kept small. The fact that the individual waveguides are highly birefringent will be a problem for the arms of a Mach-Zehnder interferometer, but this can be overcome through alternative techniques such as geometric compensation.

In order to separate the birefringence from the refractive index profile, the present invention incorporates a CTE matching material, such as undoped silica glass (USG), between the waveguide core and the cladding, At a minimum, the USG must be adjacent the sidewall of the waveguide core where the mode overlap is largest with the cladding. A directional coupler, for instance can have the adjacent inner walls coated or separated by an amount of USG for the length that the waveguide cores are closer than 15–20 microns. For ease of fabrication, the USG can be applied by plasma enhanced chemical vapor deposition PECVD as a conformal layer over a top and two side walls of the waveguide core. The USG has a CTE approximately equal to the CTE of the GSG core. Silica can also be applied as a block adjacent waveguide features and consolidated in the fabrication process. For waveguide cores less than 50 microns apart, a block of silica can be incorporated as the only material between them.

A cross-section of a directional coupler is shown in FIG. 4a as conventional in the art. A cross-section of the directional coupler in accordance with the present invention is shown in FIG. 4b including a silicon substrate 20 supporting a lower cladding layer of BSPG 22. Formed on the lower cladding layer 22 are two waveguide cores 24 of the directional coupler. The waveguide cores 24 are surrounded on three sides by a conformal layer 26 of USG applied by PECVD. The conformal layer 26 is typically about 0.5–1 micron using available techniques, though a thicker layer will provide greater advantage. The conformal layer 26 is covered with an upper cladding layer 28 of BSPG. Depending on the core and cladding materials, other materials for the conformal layer include fluorine doped phosphosilicate, boron doped aluminosilicate.

It is difficult to apply a thickness of more than a few microns of USG. It has a high melting temperature and it is difficult to fill between close waveguide structures. For integrated devices, masking techniques permit application of the USG only to the mode coupling structures and not to the remainder of the device.

FIG. 5a illustrates the birefringence perturbation superimposed on the waveguide material refractive index profile for a prior art coupler. The supermode profile which is transmitted through this stressed refractive index profile is shown in FIG. 5b. When the USG conformal layer is applied over the waveguide core, the birefringence perturbation is separated from the refractive index profile, as seen in FIG. 5c. As a result, the overlap integral between the mode field and the index is reduced.

The process for forming a directional coupler in accordance with the present invention includes the steps:
1. applying a thermal oxide buffer layer on a silicon substrate;
2. depositing by plasma enhanced chemical vapor deposition (PECVD) a core layer over the buffer layer;
3. reactive ion etching the core layer to form two individual waveguides;
4. coating the etched structure with a layer of CTE, index matched material by PECVD;
5. depositing a layer of cladding material over the top and opposite sides of the waveguides by chemical vapor deposition (CVD).

FIGS. 6–9 illustrate integrated devices, specifically a Mach-Zehnder variable optical attenuator or switch; an electrical variable optical attenuator; a parabolic horn input for an AWG (not shown); and a Y-splitter, including reduced polarization sensitivity mode coupled elements. The shading 100 indicates a silica conformal area applied to mode coupling elements of the devices. Masking can be used to apply USG as a conformal layer to the areas where it is needed, without altering the performance of other structures in the device. By applying the conformal layer to segments of integrated devices such as to the parabolic horn of an AWG or the directional couplers of a MZI, an additional source of PDL can be eliminated improving the overall PDL performance.

The embodiment(s) of the invention described above is(are) intended to be exemplary only. The scope of the invention is therefore intended to be limited solely by the scope of the appended claims.

What is claimed is:

1. A planar optical waveguide for guiding optical signals comprising:
   a substrate;
   a lower cladding layer supported on the substrate;
   a waveguide core supported on the lower cladding material having four side surfaces, the core having a refractive index (RI core) and a coefficient of thermal expansion (CTE core);
   an upper cladding layer having a refractive index (RI clad) unequal to RI core and a birefingence B; and
   a CTE matching material disposed between the waveguide core and the upper cladding layer contacting at least one surface of the waveguide core where an overlap integral between a mode profile transmitted therethrough and the cladding birefringence B is largest, the CTE matching material having a refractive index (RI material) substantially equal to RI clad and a coefficient of thermal expansion (CTE material) substantially equal to CTE core.

2. The planar optical waveguide defined in claim 1, wherein the CTE matching material has a CTE sufficiently close to CTE core for separating stress induced birefringence in the cladding from the RI profile of the waveguide core.

3. The planar optical waveguide defined in claim 2, wherein the upper cladding layer has a CTE clad substantially equal to a CTE of the substrate.

4. The planar optical waveguide defined in claim 1, wherein the CTE matching material is selected from silica, fluorine doped phosphosilicate, and boron doped aluminosilicate materials.

5. The planar optical waveguide defined in claim 1, wherein the CTE matching material is applied as a conformal layer over a top and two side surfaces of the waveguide core.

6. The planar optical waveguide defined in claim 5, wherein the conformal layer is applied to selected elements of a planar lightwave circuit.

7. The planar optical waveguide defined in claim 1, wherein the conformal layer has a thickness of at least 0.5 micron.

8. The planar optical waveguide defined in claim 1, wherein the CTE matching material is applied to at least an outer side surface of a curved waveguide core.

9. The planar optical waveguide defined in claim 1, wherein the CTE matching material is applied to two or more waveguide cores in proximity sufficient for mode coupling.

10. The planar optical waveguide defined in claim 9, wherein the CTE matching material is applied to adjacent side surfaces of the two waveguide cores for mode coupling between them.

11. The planar optical waveguide defined in claim 10, wherein the CTE matching material is applied as a conformal layer over a top and two side surfaces of the waveguide cores.

12. The planar optical waveguide defined in claim 11, wherein the conformal layer is applied to waveguides less than 20 microns apart.

13. The planar optical waveguide defined in claim 10, wherein the CTE matching material is applied as a block for consolidation between the waveguide cores.

14. The planar optical waveguide defined in claim 1, wherein the CTE matching material is applied to devices selected from: tap couplers, splitters, variable optical attenuators, electrical variable optical attenuators, parabolic horns.

15. A planar optical waveguide device comprising:
   a substrate;
   a lower cladding layer supported on the substrate;
   two optical waveguide cores on the lower cladding layer disposed sufficiently closely adjacent to each other to enable mode coupling between them of optical signals transmitted therethrough, said waveguide cores each having four sides and a refractive index (RI core) and a coefficient of thermal expansion (CTE core);
   an upper cladding layer having a refractive index (RI clad) unequal to RI core; and
   a CTE matching material disposed between the adjacent waveguide cores contacting at least one side of each of the waveguide cores opposite each other, the CTE matching material having a refractive index (RI material) substantially equal to RI clad and a coefficient of thermal expansion (CTE material) substantially equal to CTE core.

16. The planar optical waveguide device defined in claim 15, wherein the CTE matching material forms a conformal layer over the top and two side surfaces of the adjacent waveguide cores.

17. The planar optical waveguide device defined in claim 15, wherein the CTE matching material comprises all the material between the adjacent waveguide cores, and the adjacent waveguide cores are less than 50 microns apart.

* * * * *